US011257166B2

(12) United States Patent
Coonrod et al.

(10) Patent No.: US 11,257,166 B2
(45) Date of Patent: Feb. 22, 2022

(54) ROOF RISK DATA ANALYTICS SYSTEM TO ACCURATELY ESTIMATE ROOF RISK INFORMATION

(71) Applicant: Hartford Fire Insurance Company, Hartford, CT (US)

(72) Inventors: Lane Garrison Coonrod, Charlotte, NC (US); Sean David Holden, Northampton, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 17 days.

(21) Appl. No.: 16/719,319

(22) Filed: Dec. 18, 2019

(65) Prior Publication Data

US 2021/0192631 A1 Jun. 24, 2021

(51) Int. Cl.
| | | |
|---|---|---|
| *G06Q 40/08* | (2012.01) | |
| *G06K 9/62* | (2022.01) | |
| *G06N 20/00* | (2019.01) | |
| *G06N 5/04* | (2006.01) | |

(52) U.S. Cl.
CPC ............ *G06Q 40/08* (2013.01); *G06K 9/6256* (2013.01); *G06N 5/04* (2013.01); *G06N 20/00* (2019.01)

(58) Field of Classification Search
CPC .................................................... G06Q 40/08
See application file for complete search history.

(56) References Cited

U.S. PATENT DOCUMENTS

| | | | |
|---|---|---|---|
| 8,775,219 B2 | 7/2014 | Swanson et al. | |
| 9,786,011 B1 | 10/2017 | Engelhom et al. | |
| 10,062,118 B1 * | 8/2018 | Bernstein | G06Q 40/08 |
| 10,311,302 B2 | 6/2019 | Kottenstette et al. | |
| 10,366,288 B1 | 7/2019 | Kottenstette et al. | |
| 10,521,865 B1 * | 10/2019 | Spader | G06K 2009/487 |
| 2009/0265193 A1 | 10/2009 | Collins et al. | |
| 2014/0195275 A1 | 7/2014 | Pershing et al. | |
| 2014/0270492 A1 | 9/2014 | Christopulos et al. | |
| 2015/0025914 A1 | 1/2015 | Lekas | |
| 2015/0302529 A1 | 10/2015 | Jagannathan | |
| 2016/0027051 A1 | 1/2016 | Gross | |
| 2018/0336722 A1 * | 11/2018 | Pershing | G06T 17/10 |
| 2019/0205287 A1 | 7/2019 | Emison et al. | |
| 2019/0304026 A1 * | 10/2019 | Lyman | G06Q 50/165 |
| 2019/0362448 A1 * | 11/2019 | Yelovitch | G06Q 50/16 |

* cited by examiner

*Primary Examiner* — Scott C Anderson
(74) *Attorney, Agent, or Firm* — Buckley, Maschoff & Talwalkar LLC

(57) ABSTRACT

According to some embodiments, a risk relationship data store may contain electronic records, each electronic record representing a risk relationship between an enterprise and a risk relationship provider (e.g., an insurer), and including, for each risk relationship, an electronic record identifier and a set of roof attribute values. A back-end application computer server may receive, from a third-party data source, roof information for a roof of a building associated with a risk relationship. The computer server may then correlate the received roof information with a particular electronic record in the risk relationship data store. A roof attribute value of the particular electronic record may be updated in accordance with the roof information received from the third-party data source, and a predictive analytics engine of the computer server may then calculate a roof risk score associated with the particular electronic record.

18 Claims, 14 Drawing Sheets

ROOF RISK DATA ANALYTICS SYSTEM TO ACCURATELY ESTIMATE ROOF RISK INFORMATION

TECHNICAL FIELD

The present application generally relates to computer systems and more particularly to computer systems that are adapted to accurately and/or automatically estimate roof risk information and mitigation strategies for an enterprise.

BACKGROUND

An enterprise may enter into a risk relationship with a risk relationship provider (e.g., an insurer) to protect itself from damages associated with a building's roof. For example, the risk relationship may provide payments associated with roof leaks, damages due to fire, vandalism, hail, tornados, etc. Several factors may influence the amount of risk associated with a particular roof, such as roof size, the age of the roof, the materials used to construct the roof, etc. To help determine this information, FIG. 1 is a high-level block diagram of a roof data collection system 100. A back-end application computer server 150 may collect information to be processed by a roof risk platform 155. In some cases, a user might self-report roof estimated information via a remote user device 160 such as a telephone or computer. For example, an insurer might ask a business "how old is your roof" and the business might reply "I'm not sure, maybe around ten years old?" This information may then be used to calculate attributes of an insurance policy (e.g., premium values, exclusions risk classifications, etc.,) and the results may be contained in a risk relationship data store 110. Such an approach, however, can be a time consuming and unreliable process. In other cases, the insurer might arrange to perform an in-person inspection of a roof. This, however, can be an expensive way to collect information.

It would be desirable to provide systems and methods to accurately and/or automatically estimate roof risk information and mitigation strategies in a way that provides fast and accurate results. Moreover, the roof information should be easy to access, understand, update, etc.

SUMMARY OF THE INVENTION

According to some embodiments, systems, methods, apparatus, computer program code and means are provided to accurately and/or automatically estimate roof risk information and mitigation strategies in a way that provides fast and accurate results and that allow for flexibility and effectiveness when responding to those results.

In some embodiments, a risk relationship data store contains electronic records, each electronic record representing a risk relationship between an enterprise and a risk relationship provider (e.g., an insurer), and including, for each risk relationship, an electronic record identifier and a set of roof attribute values. A back-end application computer server may receive, from a third-party data source, roof information for a roof of a building associated with a risk relationship. The computer server may then correlate the received roof information with a particular electronic record in the risk relationship data store. A roof attribute value of the particular electronic record may be updated in accordance with the roof information received from the third-party data source, and a predictive analytics engine of the computer server may then calculate a roof risk score associated with the particular electronic record.

Some embodiments comprise: means for receiving, by a back-end application computer server from a third-party data source, roof information for a roof of a building associated with a risk relationship; means for correlating the received roof information with a particular electronic record in a risk relationship data store that contains electronic records, each electronic record representing a risk relationship between an enterprise and a risk relationship provider, and including, for each risk relationship, an electronic record identifier and a set of roof attribute values; means for updating a roof attribute value of the particular electronic record in accordance with the roof information received from the third-party data source; and means for calculating, by a predictive analytics engine, a roof risk score associated with the particular electronic record.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to accurately and/or automatically estimate roof risk information and mitigation strategies in a way that provides fast and accurate results. With these and other advantages and features that will become hereinafter apparent, a more complete understanding of the nature of the invention can be obtained by referring to the following detailed description and to the drawings appended hereto.

DETAILED DESCRIPTION

Figure 1:
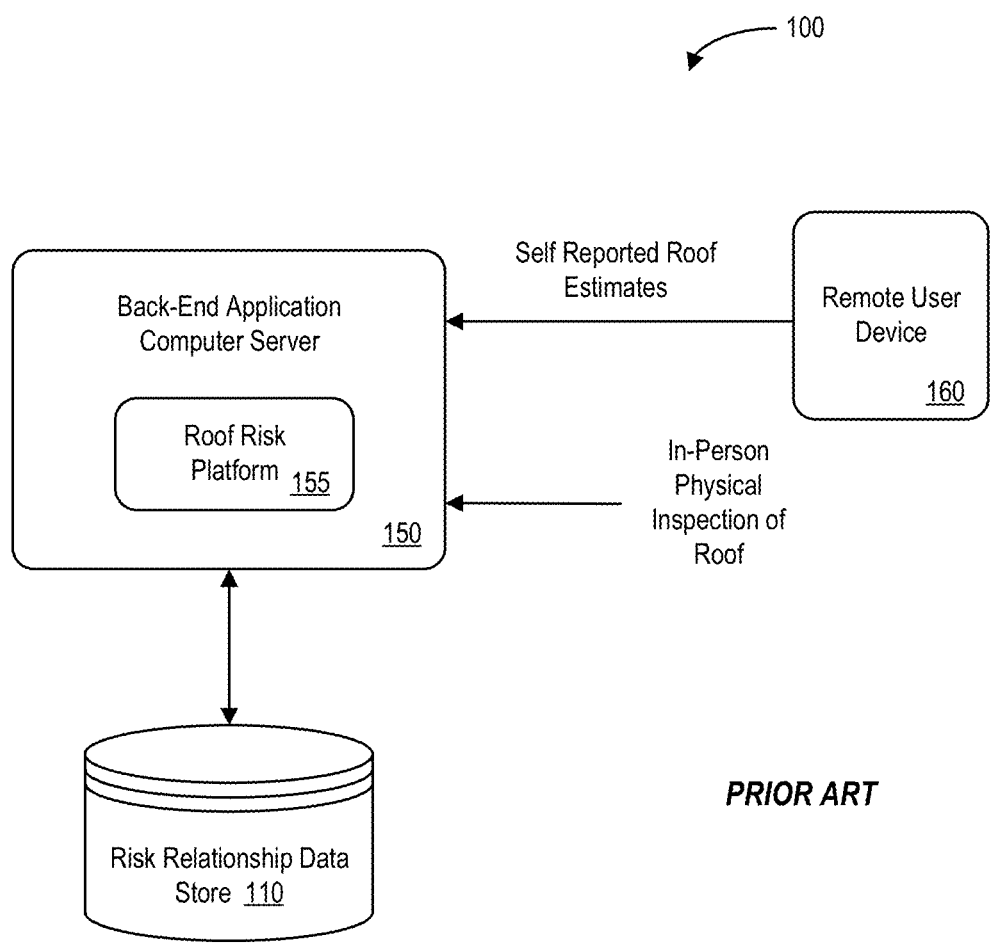
FIG. 1 is a high-level block diagram of a roof data collection system.

Before the various exemplary embodiments are described in further detail, it is to be understood that the present invention is not limited to the particular embodiments described. It is also to be understood that the terminology used herein is for the purpose of describing particular embodiments only, and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics associated with roof information. The present invention is directed to more than merely a computer implementation of a routine or conventional activity previously known in the industry as it provides a specific advancement in the area of electronic record analysis by providing improvements in data leveraging to identify roof risk factors, identify the effect of these roof risk factors on outcomes, and identify roof risk mitigation strategies to improve outcomes. The present invention provides improvement beyond a mere generic computer implementation as it involves the novel ordered combination of system elements and processes to provide improvements in data leveraging to identify roof risk factors, identify the effect of these roof risk factors on outcomes, and identify roof risk mitigation strategies to improve outcomes. Some embodiments of the present invention are directed to a system adapted to automatically analyze insurance claim records, aggregate data from multiple sources, automatically identify roof risk drivers, automatically identify how these roof risk drivers affect insurance claim outcomes, and/or automatically provide roof risk mitigation strategies that improve insurance claim outcomes. Moreover, communication links and messages may be automatically established, aggregated, formatted, etc. to improve network performance.

Figure 2:
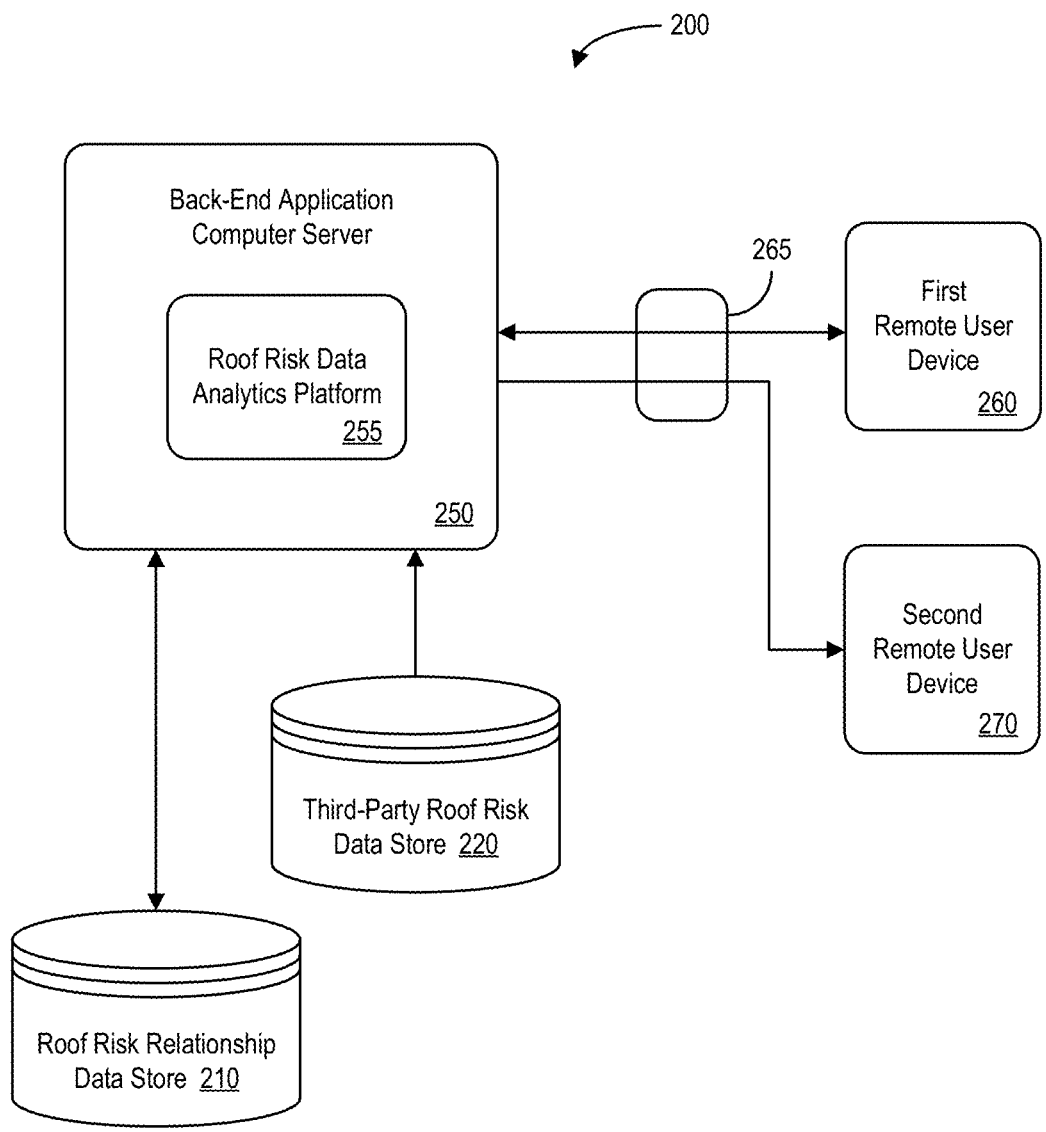
FIG. 2 is a high-level block diagram of a roof data collection system in accordance with some embodiments.

FIG. 2 is a high-level block diagram of a system 200 according to some embodiments of the present invention. In particular, the system 200 includes a back-end application computer 250 server that may access information in a roof risk relationship data store 210 (e.g., storing a set of electronic records representing roof risk associations, each record including, for example, one or more risk relationship identifiers, attribute variables, resource values, etc.). The back-end application computer server 250 may also retrieve information from other data stores or sources, such as a third-party roof risk data store 220, in connection with a roof risk data analytics platform 255 to view, analyze, and/or update the electronic records. The back-end application computer server 250 may also exchange information with a first remote user device 260 and a second remote user device 270 (e.g., via a firewall 265). According to some embodiments, an interactive graphical user interface platform of the back-end application computer server 250 (and, in some cases, third-party data) may facilitate forecasts, decisions, predictions, and/or the display of results via one or more remote administrator computers (e.g., to gather additional information about an existing association) and/or the remote user devices 260, 270. For example, the first remote user device 260 may transmit annotated and/or updated information to the back-end application computer server 250. Based on the updated information, the back-end application computer server 250 may adjust data in the roof risk relationship data store 210 and the change may be viewable via the second remote user device 270. Note that the back-end application computer server 250 and/or any of the other devices and methods described herein might be associated with a third party, such as a vendor that performs a service for an enterprise.

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate the automated access and/or update of electronic records in the roof risk relationship data store 210. As used herein, the term "automated" may refer to, for example, actions that can be performed with little (or no) intervention by a human.

As used herein, devices, including those associated with the back-end application computer server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the roof risk relationship data store 210 and/or a third-party roof risk data store 220 (e.g., associated with a different entity company as compared to the roof risk relationship data store 210). The data stores 210, 220 may be locally stored or reside remote from the back-end application computer server 250. As will be described further below, the roof risk relationship data store 210 may be used by the back-end application computer server 250 in connection with an interactive user interface to access and update electronic records. Although a single back-end application computer server 250 is shown in FIG. 2, any number of such devices may be included. Moreover, various devices described herein might be combined according to embodiments of the present invention. For example, in some embodiments, the back-end application computer server 250 and roof risk relationship data store 210 might be co-located and/or may comprise a single apparatus.

Figure 3:
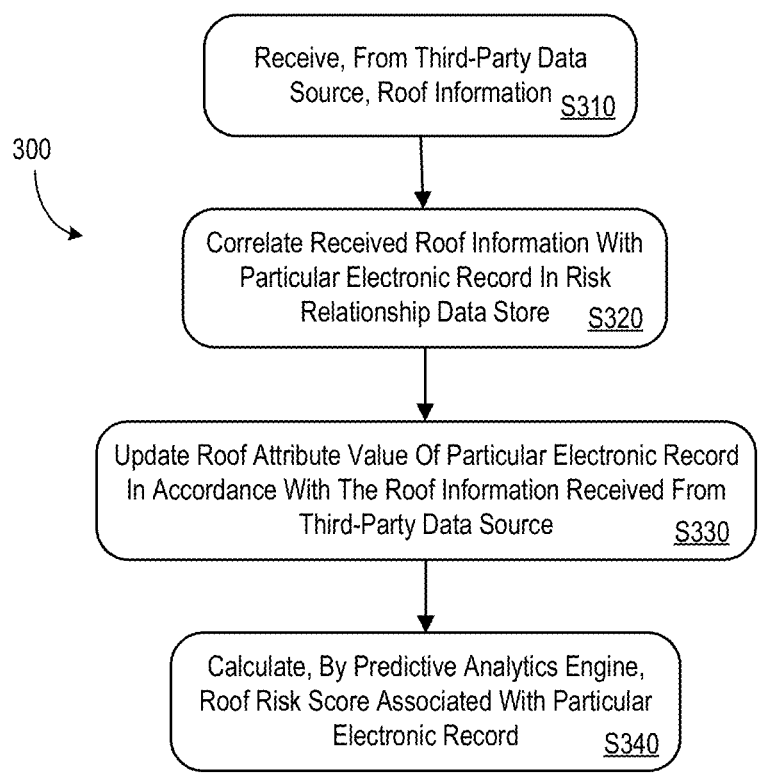
FIG. 3 illustrates a roof data collection method according to some embodiments of the present invention.

Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a back-end application computer server may receive, from a third-party data source, roof information for a roof of a "building" associated with a risk relationship. As used herein, the term "building" may refer to, for example, an office building, a warehouse, a residence, a hanger, a retail establishment, a stadium, etc. Moreover, the term "roof" may refer to any structure forming the upper covering of a building, including the materials and constructions necessary to support it on the walls of the building or on uprights. In general, a roof may be any structure that provides protection against rain, snow, sunlight, extreme temperatures, wind, etc.

At S320, the system may correlate the received roof information with a particular electronic record in a risk relationship data store (e.g., with a particular insurance policy). The risk relationship data store may, according to some embodiments, contain electronic records, with each electronic record representing a risk relationship between an enterprise (e.g., a business or homeowner) and a risk relationship provider (e.g., an insurer). The electronic record may include, for each risk relationship, an electronic record identifier and a set of roof attribute values (e.g., the age of a roof, the materials used to construct the roof, etc.).

At S330, the system may update a roof attribute value of the particular electronic record in accordance with the roof information received from the third-party data source. The updated roof attribute data may be, for example, associated with a roof size, a roof age, a roof covering material, a roof shape, a roof risk evaluation, a roof hazard (e.g., are tree limbs or powerlines dangerously close to a roof?), etc. Note that in some cases the updated roof attribute data might be associated with a solar panel, a chimney, building heating or cooling equipment (e.g., an air conditioner unit), a water tank, a gutter condition (e.g., is there vegetation growing in the gutter?), a roof extension (e.g., an awning), a satellite dish, public roof use (e.g., is there a bar, lounge, or swimming pool located on the rooftop?), a skylight, etc.

At S340, a predictive analytics engine may calculate a roof risk score associated with the particular electronic record. For example, an older roof might be associated with a higher risk score (e.g., representing a greater amount of risk or cost) as compared to a younger roof. As used herein, the phrase "risk score" might refer to any numerical value, category, ranking, symbol or set of symbols, code, etc. According to some embodiments, the roof risk score is utilized to automatically establish a communication link with an electronic address associated with the risk relationship and transmit an email message, a calendar event, a workflow instruction, etc.

In some embodiments, the third-party data source may be associated with aerial imagery of a roof or a portion of a roof. Examples of aerial imagery might include satellite imagery, drone imagery, a picture taken by an inspector using a camera mounted on an extendible mount, etc. In this case, the back-end application computer server may be programmed to use a machine learning algorithm to analyze the aerial imagery to determine one or more updated roof attribute values. According to some embodiments, the machine learning algorithm utilizes historic insurance claim data (e.g., roofs of a similar age, in a similar geographic location, and constructed using the same materials might be associated with similar risk scores).

In other embodiments, the third-party data source may be associated with a roof vendor, a roof installer, a governmental agency, etc. For example, an image of a vendor invoice or contract might be analyzed to determine various details about the roof. Similarly, a town or county database might contain construction or building permits, inspection reports, and similar documents that might be analyzed to determine various details about a roof. According to some embodiments the third-party data might be associated with a roof material (e.g., including the brand name of the material used to form the roof) and/or a roof warranty (e.g., a roof life expectancy warranty, a guarantee that a roof material will not be damaged by certain weather events, etc.).

In still other embodiments, the third-party data source may be associated with street level images. For example, a vehicle (including an autonomous vehicle, drone, etc.) might collect visual information about a street or town. In this case, the back-end application computer server may be programmed to use the street level images to construct a three-dimensional model associated with the updated roof attribute data. Note that information from multiple-third party sources may be combined, blended, and/or aggregated to generate a "roof symbol." As used herein, the phrase "roof symbol" may refer to any computer or logical structure that contains information about a roof collected from multiple sources.

Figure 4:
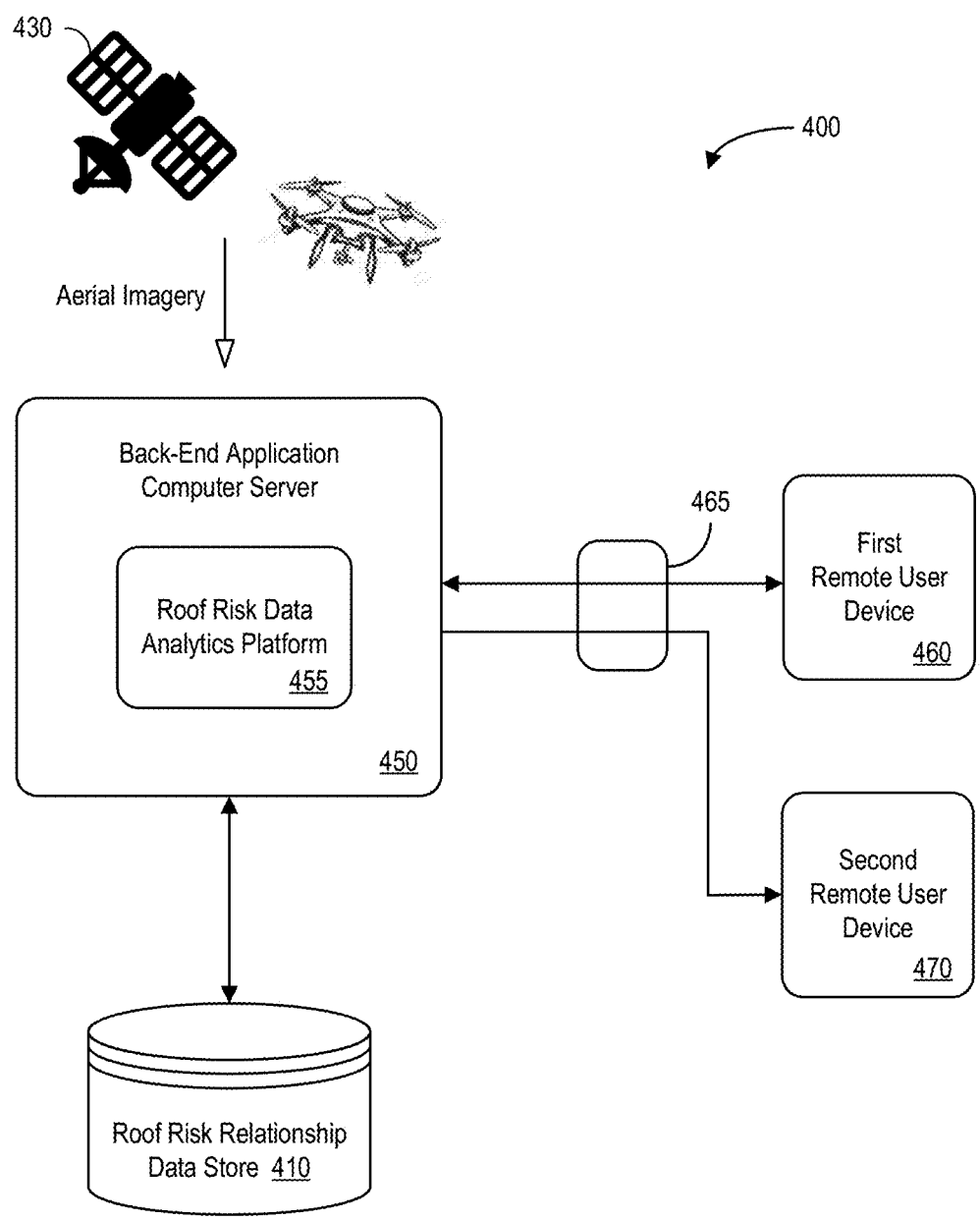
FIG. 4 is a block diagram of a system including aerial imagery in accordance with some embodiments.

FIG. 4 is a block diagram of a system 400 including aerial imagery in accordance with some embodiments. As before, a back-end application computer server 450 may use a roof risk data analytics platform 455 to analyze information in a roof risk relationship data store 410. Moreover, the back-end application computer server 450 may exchange information (e.g., via a firewall 465) with multiple remote user devices 460, 470 (e.g., such as those associated with businesses, underwriters, claims handlers, etc.). According to some embodiments, the back-end application computer server 450 may also receive aerial imagery associated with one or more satellites 430, drones, etc. The aerial imagery might be associated with, for example, governmental satellites, online mapping services, autonomous drones, etc. The aerial imagery may then be analyzed by the roof risk data analytics platform 455 and used to determine a roof risk score (e.g., if the presence of a large tarp is detected on the roof, the roof risk score may be increased).

Note that the characteristics of a roof may, in some cases, be dependent upon various factors such as the purpose of the building that it covers, the roofing materials that were utilized, local construction techniques, and/or legislation or regulations. According to some embodiments, the roof risk data analytics platform 455 may attempt to automatically determine what materials were used to construct the roof, such as slate, copper, aluminum sheeting, pre-cast concrete, ceramic tiles, asphalt, coal tar pitch, Ethylene Propylene Diene Monomer ("EPDM") rubber, Hypalon, polyurethane foam, Polycarbonate membranes and corrugated panels, TEFLON® fabric, Thermoplastic Polyolefin ("TPO"), wood shakes and shingles, etc.

Figure 5:
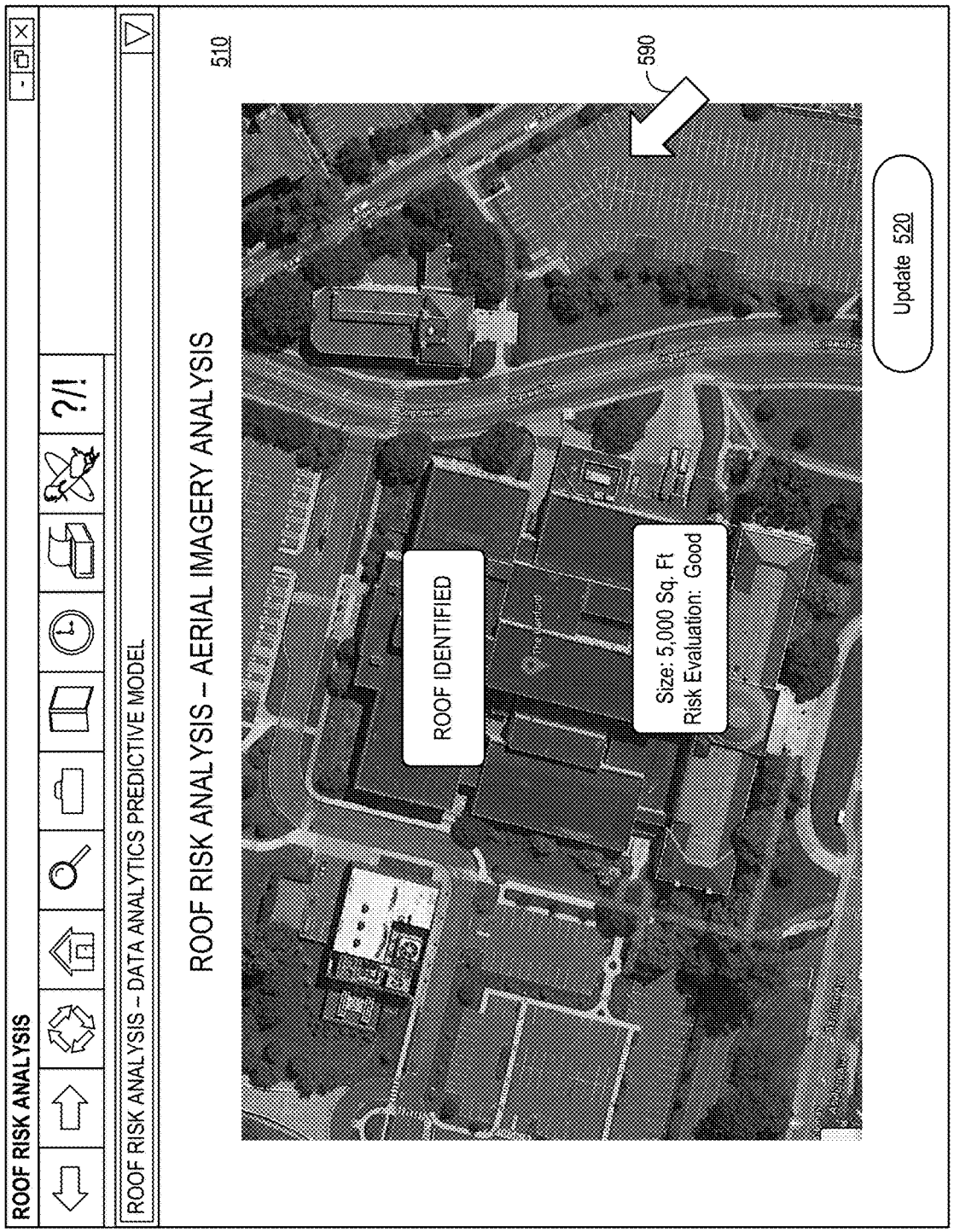
FIG. 5 is a roof risk analysis display including aerial imagery according to some embodiments.

The data analyzed by the system 400 may then be presented on a GUI. For example, FIG. 5 is a roof risk analysis display 500 including aerial imagery according to some embodiments. The display 500 includes an aerial photographic image 510 of a building being analyzed. The image 510 may be automatically analyzed to locate the roof, estimate a roof size, determine an overall roof risk evaluation, etc. and this information may be overlaid on the image 510 as appropriate. Selection of a portion or element of the display 500 might result in the presentation of additional information about that portion or element (e.g., selecting "Roof Identified" in FIG. 5 might result in a popup window presenting the street address associated with the roof) or let an operator or administrator enter or annotate additional information about a roof (e.g., based on his or her experience and expertise). Selection of an "Update" icon 520 (e.g., by touchscreen or computer mouse pointer 590) might cause the system or platform to re-analyze the image information.

Figure 6:
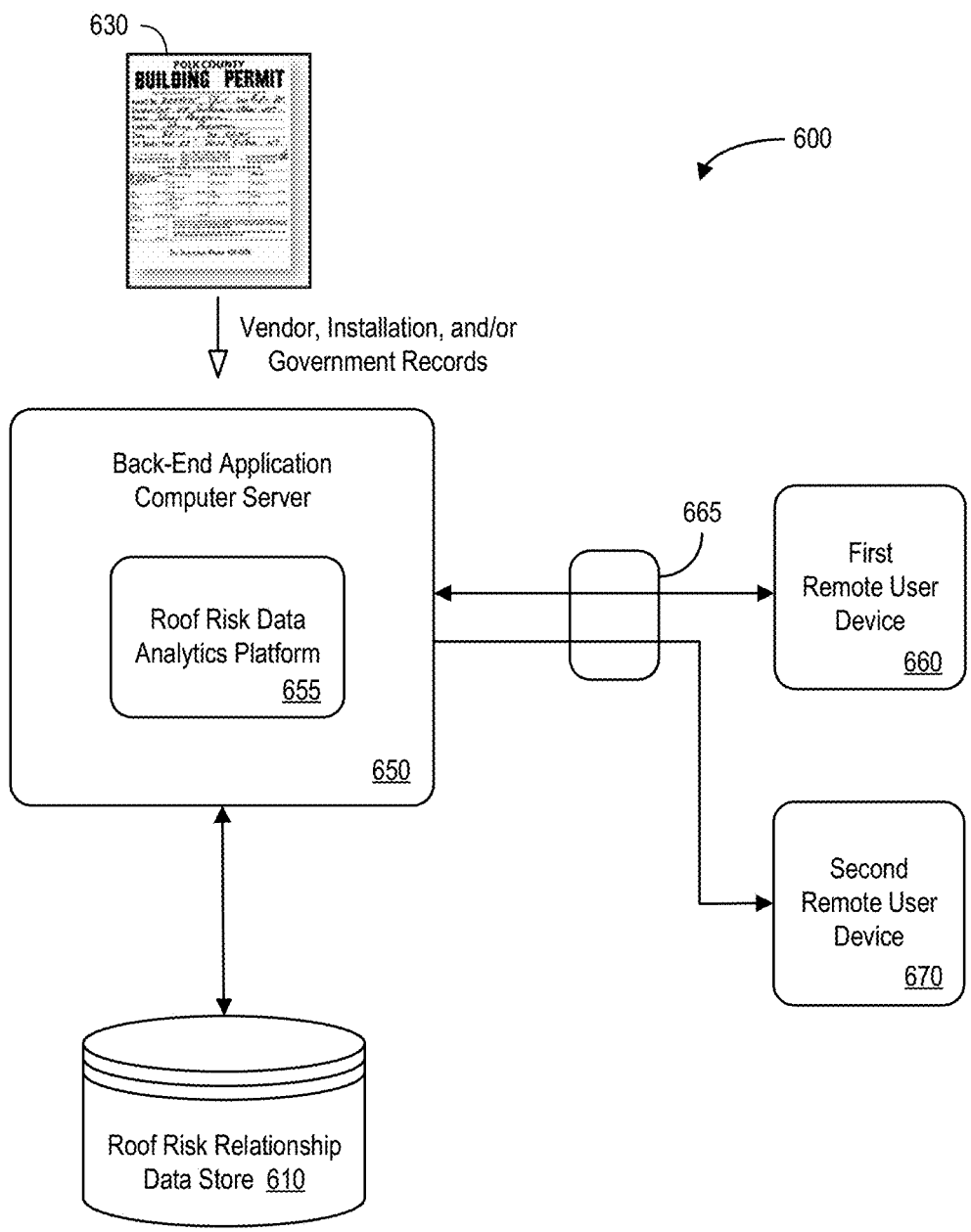
FIG. 6 is a block diagram of a system including vendor, installation, and/or government records in accordance with some embodiments.

FIG. 6 is a block diagram of a system 600 including vendor, installation, and/or government records in accordance with some embodiments. As before, a back-end application computer server 650 may use a roof risk data analytics platform 655 to analyze information in a roof risk relationship data store 610. Moreover, the back-end application computer server 650 may exchange information (e.g., via a firewall 665) with multiple remote user devices 660, 670 (e.g., such as those associated with businesses, underwriters, claims handlers, etc.). According to this embodiment, the back-end application computer server 650 may also receive vendor, installation, and/or government records 630. The records 630 might be associated with, for example, contracts, purchase orders, warrantees, construction permits. The records 630 may include electronic files, images, handwritten notes, etc. and may be analyzed by the roof risk data analytics platform 655 and used to determine a roof risk score (e.g., the exact year a roof was re-surfaced might be determined based on a date in a contract). The system 600 may analyze the records 630 using, for example, Optical Character Recognition ("OCR"), Natural Language Processing ("NLP"), voice recognition, and similar technologies.

Figure 7:
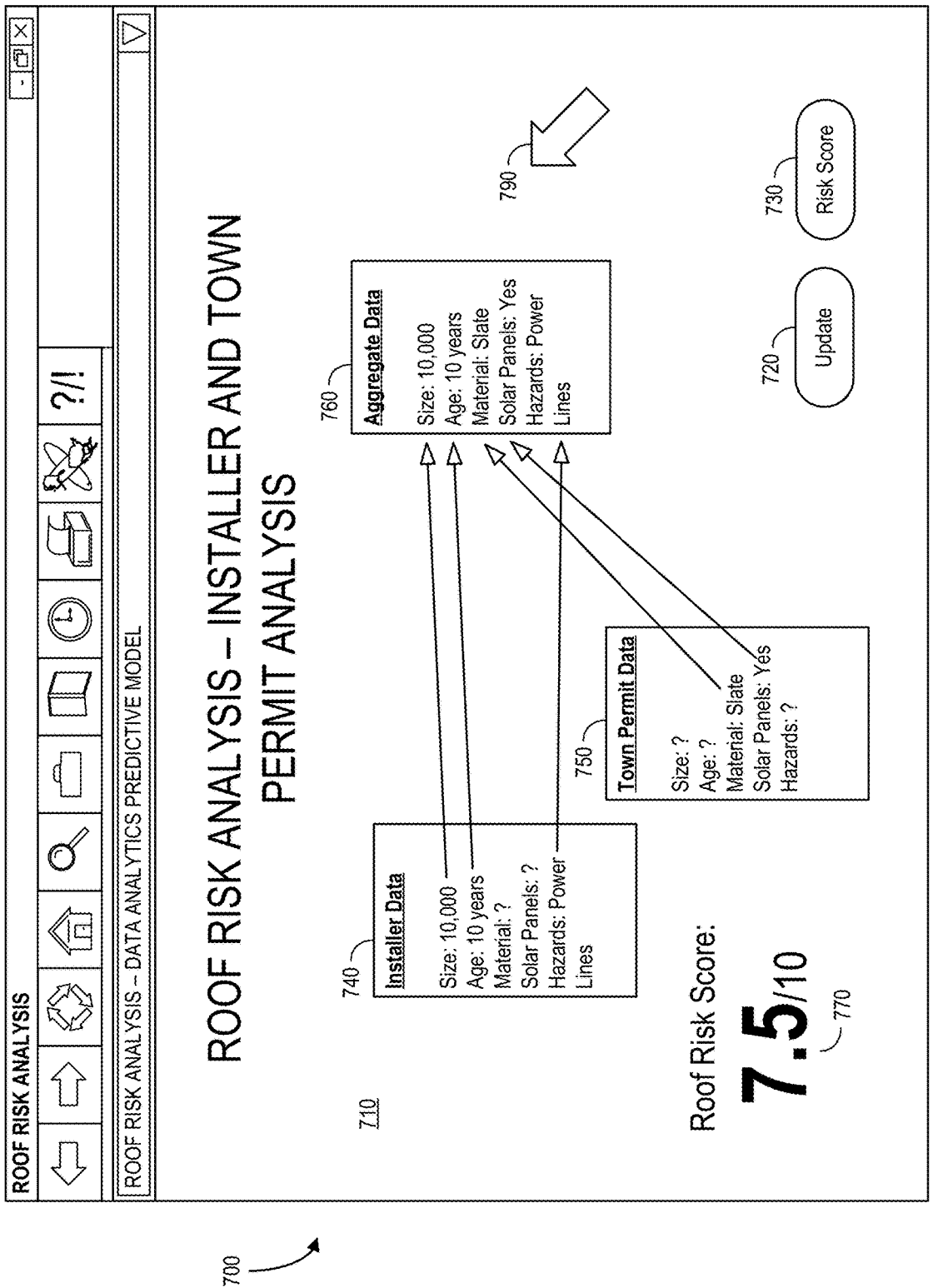
FIG. 7 is a roof risk analysis display including vendor, installation, and/or government records according to some embodiments.

The data analyzed by the system 400 may then be presented on a GUI. For example, FIG. 7 is a roof risk analysis display 700 including graphical elements 710 associated with third-party records according to some embodiments. The display 700 also includes an "Update" icon 720 that may be used to re-analyze roof information, and a "Risk Score" icon 730 that may be used to initiate calculation of a risk rating or category. In addition, the display 700 includes installer data 740 and town permit data 750 records. Information from these records 740, 750 may be compared and/or combined to create aggregate data 760. In the example of FIG. 7, the aggregate data 760 includes information from both the installer data 740 (e.g., the roof size) and the town permit data 750 (e.g., the roof material). The display 700 also includes an indication of the current risk score 770 assigned to the roof (e.g., calculated in accordance with the aggregate data 760). Selection of a portion or element of the display 700 (e.g., by touchscreen or computer mouse pointer 790) might result in the presentation of additional information about that portion or element or let an operator or administrator enter or annotate additional information about a roof (e.g., based on his or her experience and expertise).

Figure 8:
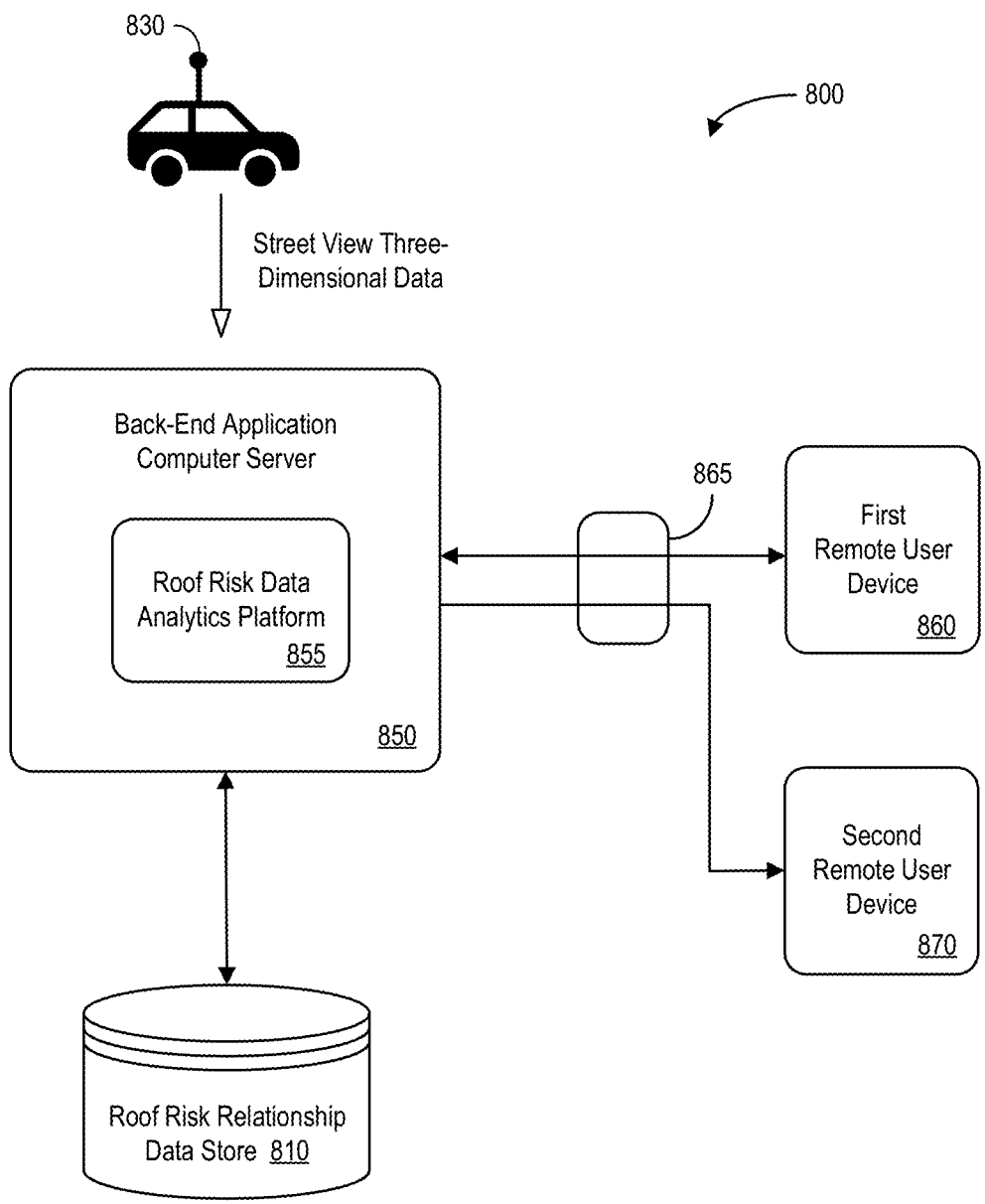
FIG. 8 is a block diagram of a system including street view three-dimensional data in accordance with some embodiments.

FIG. 8 is a block diagram of a system 800 including street view three-dimensional data in accordance with some embodiments. As before, a back-end application computer server 850 may use a roof risk data analytics platform 855 to analyze information in a roof risk relationship data store 810. Moreover, the back-end application computer server 850 may exchange information (e.g., via a firewall 865) with multiple remote user devices 860, 870 (e.g., such as those associated with businesses, underwriters, claims handlers, etc.). According to this embodiment, the back-end application computer server 850 may also receive street view three-dimensional data 830. The three-dimensional data 830 might be collected by a vehicle (including autonomous vehicles and drones) equipped with cameras, video recorders, Light Detection and Ranging ("LIDAR") equipment, etc. This street view data may then be processed to create three-dimensional models that can be used to help analyze roofs. Note that the construction of a roof may be determined by its method of support, how the underneath space is bridged, and/or whether or not the roof is sloped or "pitched" (with pitch representing the angle at which the roof rises from its lowest to highest point). The three-dimensional data 830 may be analyzed to help determine this information along with the basic shapes of the roof (e.g., flat, mono-pitched, gabled, hipped, butterfly, arched, domed, etc.).

Figure 9:
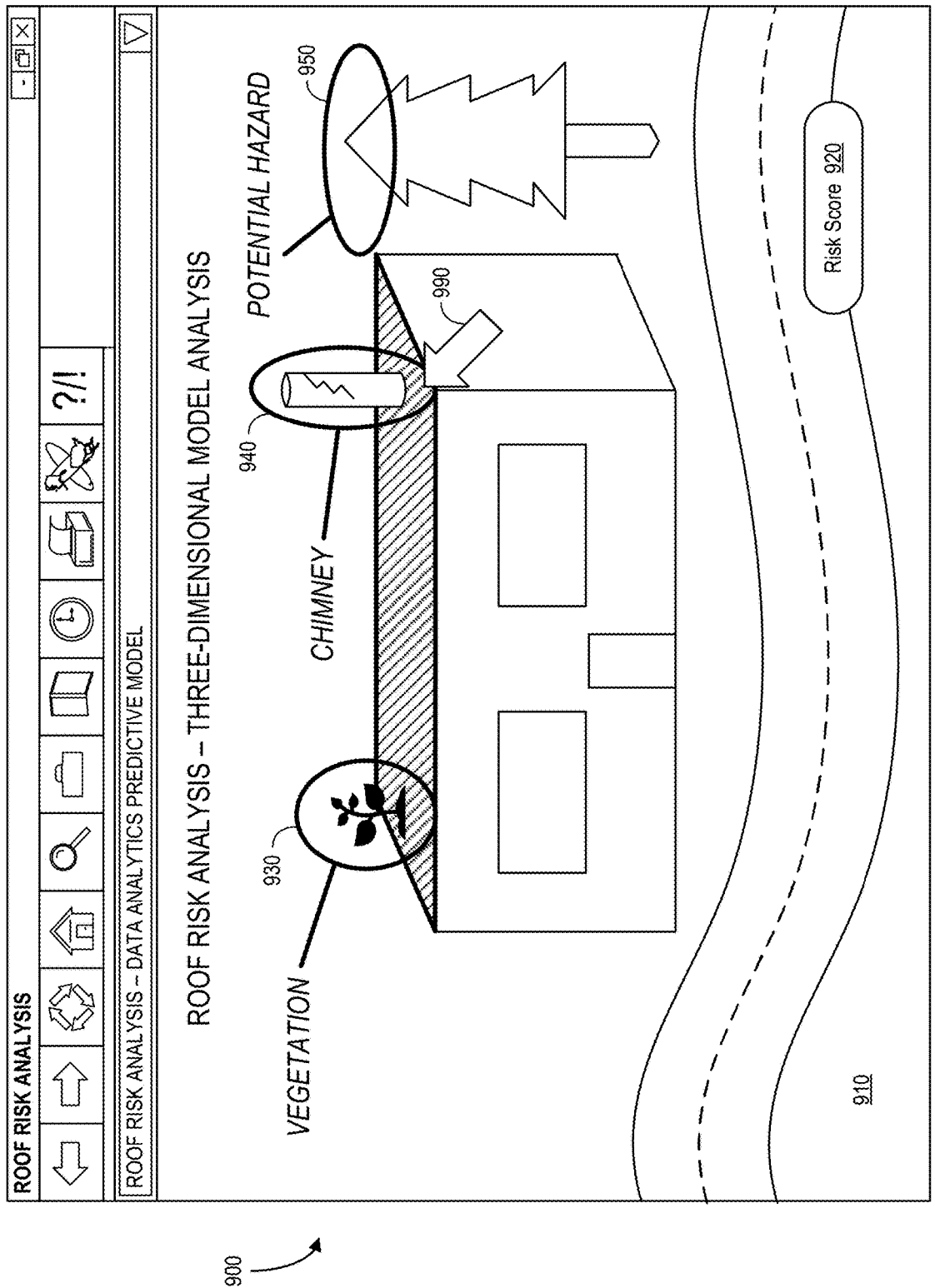
FIG. 9 is a roof risk analysis display including street view three-dimensional data according to some embodiments.

FIG. 9 is a roof risk analysis display 900 including street view three-dimensional data 910 according to some embodiments. The display 900 also includes a "Risk Score" icon 920 that may be used to initiate calculation of a risk rating or category. In addition, the display 900 includes automatically identified roof features 930, 940, 950 of a roof (with roof being represented as a crosshatched area in FIG. 9). In particular, the features include: vegetation growing on the roof 930, a cracked or crumbling chimney 940, and branches that are dangerously close to the roof 950. Selection of a portion or element of the display 900 (e.g., by touchscreen or computer mouse pointer 990) might result in the presentation of additional information about that portion or element or let an operator or administrator enter or annotate additional information about a roof (e.g., based on his or her experience and expertise).

Figure 10:
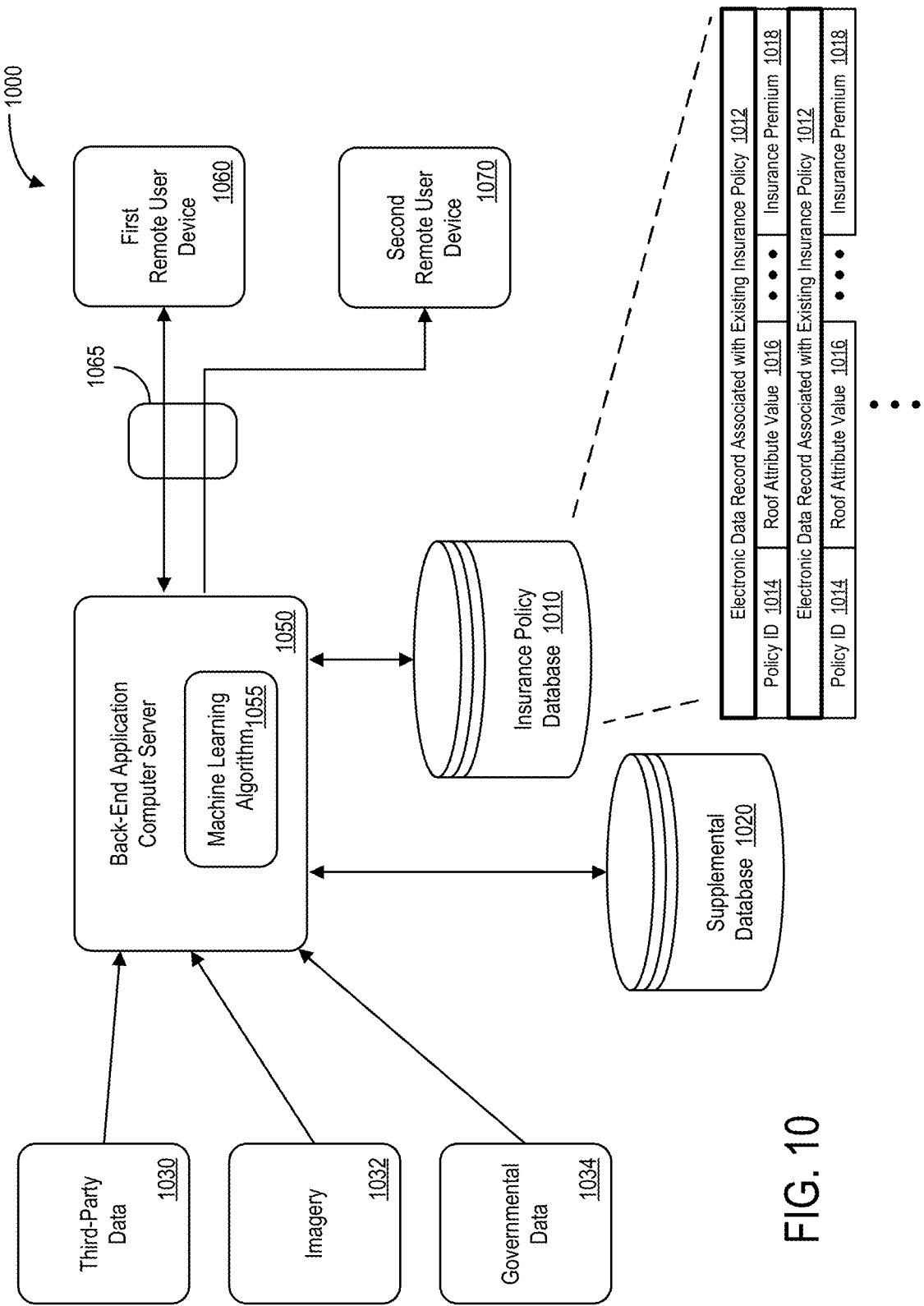
FIG. 10 is a more detailed block diagram of a roof data collection system according to some embodiments.

FIG. 10 is a more detailed block diagram of a roof data collection system 1000 according to some embodiments. Here, a back-end application computer server 1050 uses a machine learning algorithm 1055 to analyze information in an insurance policy database 1010. The insurance policy database 1010 may contain, for example, electronic data records 1012 containing a policy identifier 1014, roof attribute values 1016, insurance premium values 1018, etc. The machine learning algorithm 1055 may also receive information from a supplemental database 1020 (e.g., historic insurance claims associated with other roofs), third-party data 1030, imagery 1032, and governmental data 1034. Moreover, the back-end application computer server 1050 may exchange information (e.g., via a firewall 1065) with multiple remote user devices 1060, 1070 (e.g., such as those associated with businesses, underwriters, claims handlers, etc.). In this way the system 1000 may blend data from various sources to improve the roof symbol (and, thus, the accuracy of the risk analysis).

Figure 11:
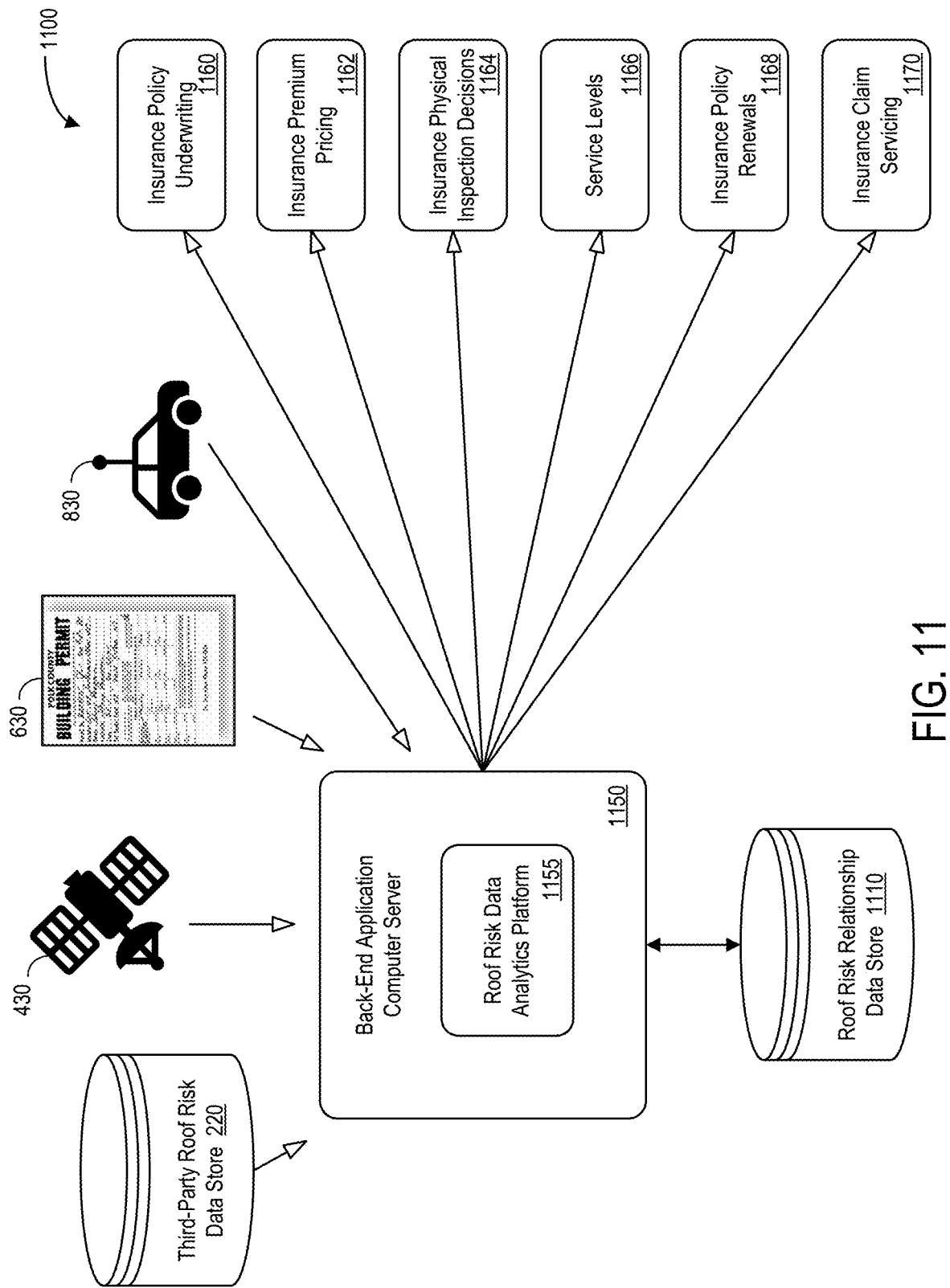
FIG. 11 is a roof data analysis information flow diagram according to some embodiments.

FIG. 11 is a roof data analysis information flow diagram 1100 according to some embodiments. As before, a back-end application computer server 1150 exchanges information with a roof relationship data store 1110. A roof risk data analytics platform 1155 may further receive information from a third-party roof risk data store 220, aerial imagery associated with a satellite 430 or drone, vendor, installation, and/or government records 630, and street level three-dimensional data 830. The roof risk data analytics platform 1155 may then combine all of this disparate, heterogeneous data to calculate a risk score for a roof. The risk score may then be used in connection with insurance policy underwriting 1160, insurance premium pricing 1162, insurance physical inspection decisions 1164 (e.g., do we need to send an inspector on-site?), service levels 1166, insurance policy renewals 1168 (e.g., do we still want to insure this particular roof), insurance claim servicing 1170, etc.

Figure 12:
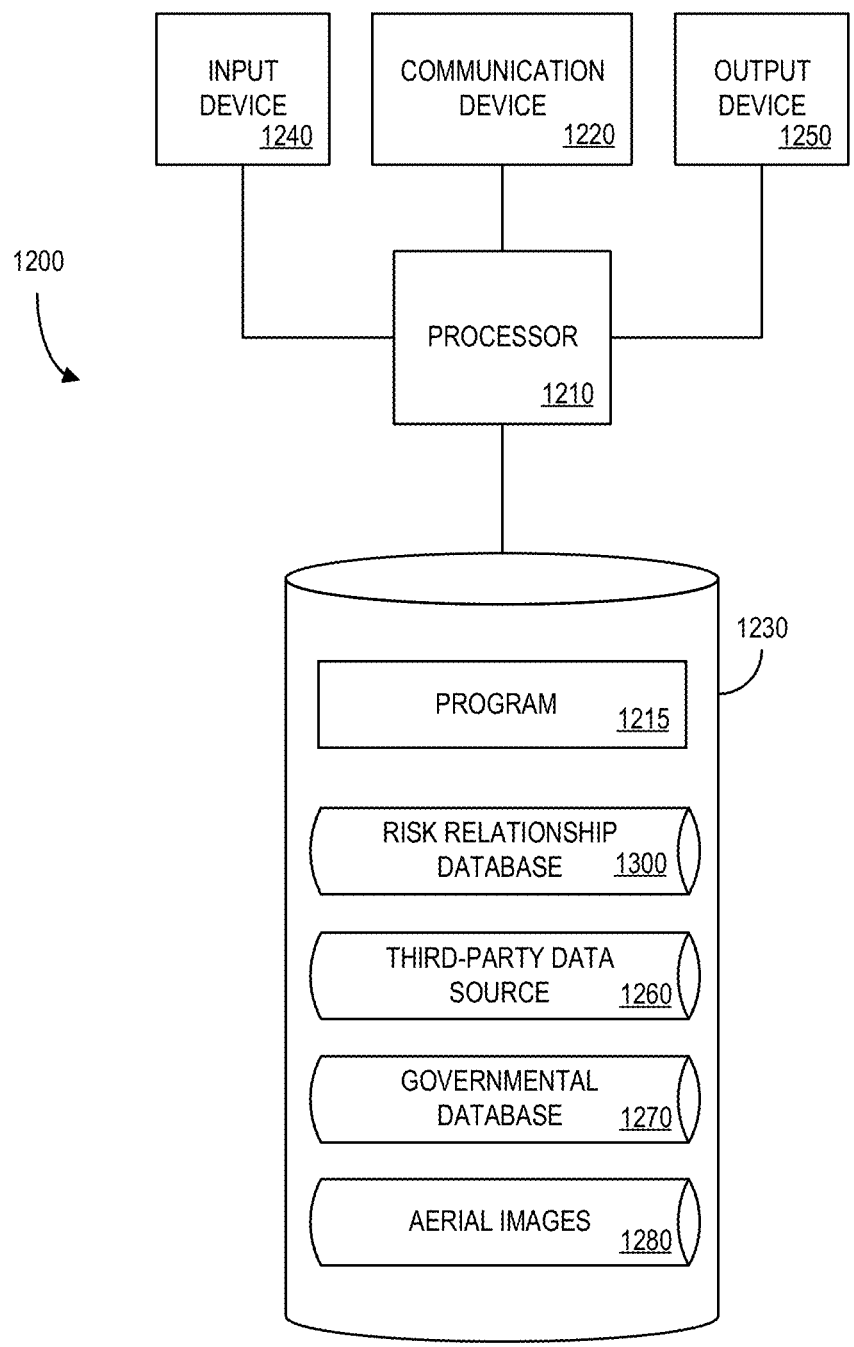
FIG. 12 is a block diagram of an apparatus in accordance with some embodiments of the present invention.

The embodiments described herein may be implemented using any number of different hardware configurations. For example, FIG. 12 illustrates an apparatus 1200 that may be, for example, associated with the systems 200, 1100 described with respect to FIGS. 2 and 11, respectively. The apparatus 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote third-party roof information suppliers, administrator computers, and or communication devices (e.g., PCs and smartphones). Note that communications exchanged via the communication device 1220 may utilize security features, such as those between a public internet user and an internal network of an insurance company and/or an enterprise. The security features might be associated with, for example, web servers, firewalls, and/or PCI infrastructure. The apparatus 1200 further includes an input device 1240 (e.g., a mouse and/or keyboard to enter information about roofs, maps, third-parties, etc.) and an output device 1250 (e.g., to output reports regarding roof risk factors, recommended changes, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or a roof risk evaluation tool or application for controlling the processor 1210. The processor 1210 performs instructions of the program 1215, and thereby operates in accordance with any of the embodiments described herein. For example, the processor 1210 may receive, from a third-party data source, roof information for a roof of a building associated with a risk relationship. The processor 1210 may then correlate the received roof information with a particular electronic record in the risk relationship data store. A roof attribute value of the particular electronic record may be updated in accordance with the roof information received from the third-party data source, and the processor 1210 may then calculate a roof risk score associated with the particular electronic record.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the back-end application computer server 1200 from another device; or (ii) a software application or module within the back-end application computer server 1200 from another software application, module, or any other source.

In some embodiments (such as shown in FIG. 12), the storage device 1230 further stores a risk relationship database 1300, a third-party data source 1260 (e.g., associated with someone other than the insured and the insurer), a governmental database 1270 (e.g., storing recording of past building permits, inspections, etc.), and aerial images 1280. An example of a database that might be used in connection with the apparatus 1200 will now be described in detail with respect to FIG. 13. Note that the database described herein is only an example, and additional and/or different information may be stored therein. Moreover, various databases might be split or combined in accordance with any of the embodiments described herein. For example, the risk relationship database 1300 and account third-party data source 1260 might be combined and/or linked to each other within the program 1215.

Figure 13:
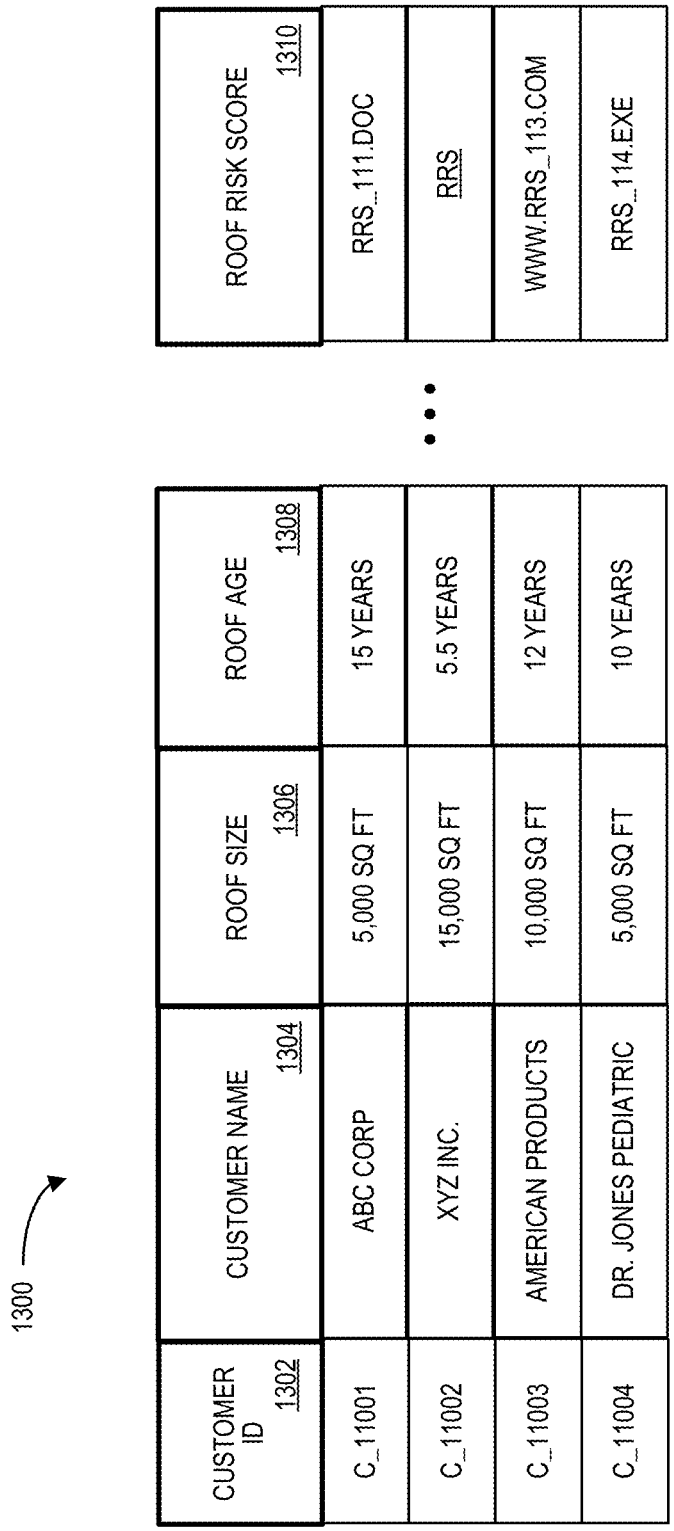
FIG. 13 is a portion of a tabular risk relationship database according to some embodiments.

Referring to FIG. 13, a table is shown that represents the risk relationship database 1300 that may be stored at the apparatus 1300 according to some embodiments. The table may include, for example, entries associated with insurance policies that have been sold to an enterprise. The table may also define fields 1302, 1304, 1306, 1308, 1310 for each of the entries. The fields 1302, 1304, 1306, 1308, 1310 may, according to some embodiments, specify: a customer identifier 1302, a customer name 1304, a roof size 1306, roof age 1308, and a roof risk score 1310. The risk relationship database 1300 may be created and updated, for example, based on information electrically received from various computer systems, including those associated with a third-party.

The customer identifier 1302 may be, for example, a unique alphanumeric code identifying a customer who has purchased an insurance policy. The customer name 1304 may be associated with the insured, and the roof size 1306 might indicate how large of an area is covered by a roof. The roof age 1308 might indicate how long ago the roof was installed (or a date on which the roof was installed). The roof size 1306 and roof age 1308 (and similar information) may then be used to calculate the roof risk score 1310 (which, in turn, might be used to generate an appropriate premium value, recommend changes that might help reduce the roof risk score, etc.

Thus, embodiments may provide an automated and efficient way of mining roof data (e.g., associated with various insurers, governmental agencies, third-parties, etc.) to identify roof risk factors and for developing roof risk mitigation strategies in a way that provides fast and accurate results. Embodiments may also provide an ability to access and interpret data in a holistic, tactical fashion. According to some embodiments, the system may be agnostic regarding particular web browsers, sources of information, etc. For example, information from multiple sources (e.g., an internal insurance policy database and an external data store) might be blended and combined (with respect to reading and/or writing operations) so as to appear as a single "pool" of information to a user at a remote device. Moreover, embodiments may be implemented with a modular, flexible approach such that deployment of a new system for an enterprise might be possible relatively quickly.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
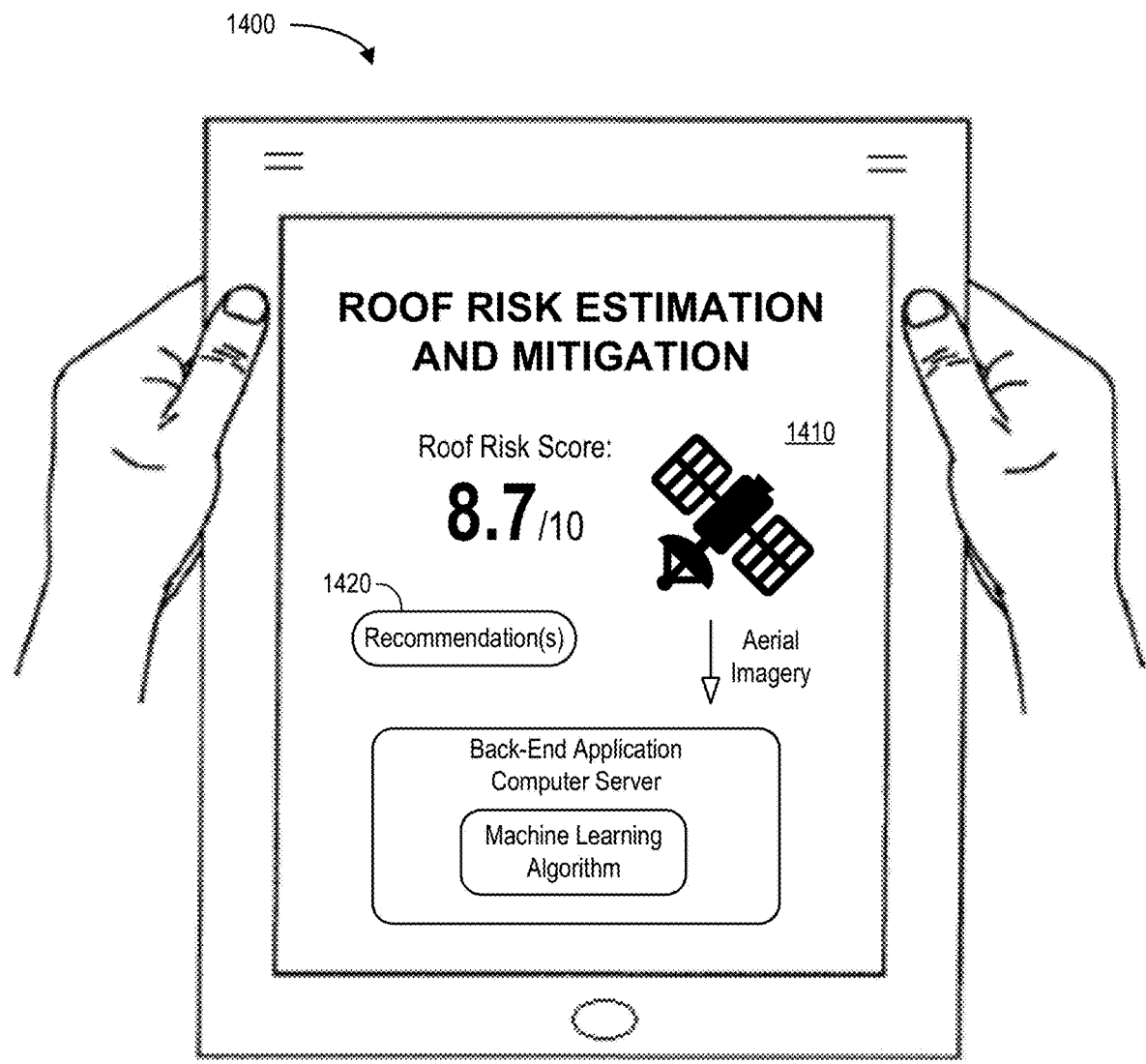
FIG. 14 illustrates a tablet computer displaying a roof risk estimation and mitigation user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, automobile insurance policies, etc.). Similarly, although certain attributes were described in connection some embodiments herein, other types of attributes might be used instead. Still further, the displays and devices illustrated herein are only provided as examples, and embodiments may be associated with any other types of user interfaces. For example, FIG. 14 illustrates a handheld tablet computer 1400 showing a roof risk estimation and mitigation display 1410 according to some embodiments. The roof risk estimation and mitigation display 1410 might include user-selectable data that can be selected and/or modified by a user of the handheld computer 1400 (e.g., via an "Recommendation" icon 1420) to view updated insurance information associated with an enterprise (e.g., including, in some embodiments, steps that should be taken to reduce roof risk). Note that embodiments may have applications to structures other than roofs, such as piers, airport runways, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A roof risk data analytics system implemented via a back-end application computer server, comprising:
   (a) a risk relationship data store that contains electronic records, each electronic record representing a risk relationship between an enterprise and a risk relationship provider, and including, for each risk relationship, an electronic record identifier and a set of roof attribute values;
   (b) the back-end application computer server, coupled to the risk relationship data store, including:
      a computer processor, and
      a computer memory, coupled to the computer processor, storing instructions that, when executed by the computer processor, cause the back-end application computer server to:
         receive, from a third-party data source, roof information for a roof of a building associated with a risk relationship,
         receive aerial imagery for the roof of the building;
         receive street level imagery for the roof of the building;
         automatically correlate the received third-party roof information, aerial imagery, and street level imagery with a particular electronic record in the risk relationship data store,
         analyze the aerial imagery using a machine learning algorithm and historic insurance claim data to determine an updated roof attribute value;
         update a roof attribute value of the particular electronic record in accordance with the updated roof attribute value, and
         calculate, by a predictive analytics engine, a roof risk score associated with the particular electronic record; and
   (c) a communication port coupled to the back-end application computer server to facilitate a transmission of data with remote user devices to support interactive user interface displays, including an indication of the roof information received from the third-party data source and the roof risk score, via a distributed communication network.

2. The system of claim 1, wherein the third-party data source is associated with at least one of: (i) satellite imagery, and (ii) drone imagery.

3. The system of claim 1, wherein the third-party data source is associated with at least one of: (i) a roof vendor, (ii) a roof installer, (iii) a governmental agency, (iv) a roof material, and (v) a roof warranty.

4. The system of claim 1, wherein the back-end application computer server is further programmed to use the street level images to construct a three-dimensional model associated with the updated roof attribute data.

5. The system of claim 1, wherein the updated roof attribute data is associated with at least one of: (i) a roof square footage, (ii) a roof age, (iii) a roof covering material, (iv) a roof shape, (v) a roof risk evaluation, and (vi) a roof hazard.

6. The system of claim 1, wherein the updated roof attribute data is associated with at least one of: (i) a solar panel, (ii) a chimney, (iii) building heating or cooling equipment, (iv) a water tank, (v) a gutter condition, (vi) a roof extension, (vii) a satellite dish, (viii) public roof use, and (ix) a skylight.

7. The system of claim 1, wherein the building is associated with at least one of: (i) an office building, (ii) a warehouse, (iii) a residence, (iv) a hanger, (v) a retail establishment, (vi) a stadium, and (vii) any other building structure that is associated with a risk relationship.

8. The system of claim 1, wherein the risk relationship is associated with an insurance policy and the risk score is to be used in connection with at least one of: (i) insurance policy underwriting, (ii) insurance premium pricing, (iii) insurance physical inspection decisions, (iv) service levels, (v) insurance policy renewals, and (vi) insurance claim servicing.

9. The system of claim 1, wherein the roof risk score is utilized to automatically establish a communication link with an electronic address associated with the risk relationship and transmit at least one of: (i) an email message, (ii) a calendar event, and (iii) a workflow instruction.

10. A computerized roof risk data analytics method implemented via a back-end application computer server, comprising:
    receiving, by a computer processor of the back-end application computer server from a third-party data source, roof information for a roof of a building associated with a risk relationship;
    receiving, by the computer processor, aerial imagery for the roof of the building;
    receiving, by the computer processor, street level imagery for the roof of the building;
    automatically correlating the received third-party roof information, aerial imagery, and street level imagery with a particular electronic record in a risk relationship data store that contains electronic records, each electronic record representing a risk relationship between an enterprise and a risk relationship provider, and including, for each risk relationship, an electronic record identifier and a set of roof attribute values;
    analyzing, by the computer processor, the aerial imagery using a machine learning algorithm and historic insurance claim data to determine an updated roof attribute value;
    updating a roof attribute value of the particular electronic record in accordance with the updated roof attribute value; and
    calculating, by a predictive analytics engine, a roof risk score associated with the particular electronic record.

11. The method of claim 10, wherein the third-party data source is associated with at least one of: (i) satellite imagery, and (ii) drone imagery.

12. The method of claim 10, wherein the third-party data source is associated with at least one of: (i) a roof vendor, (ii) a roof installer, (iii) a governmental agency, (iv) a roof material, and (v) a roof warranty.

13. The method of claim 10, wherein the back-end application computer server is further programmed to use the street level images to construct a three-dimensional model associated with the updated roof attribute data.

14. A non-transitory, computer-readable medium storing instructions, that, when executed by a processor, cause the processor to perform a roof risk data analytics method implemented via a back-end application computer server, the method comprising:
receiving, by a computer processor of the back-end application computer server from a third-party data source, roof information for a roof of a building associated with a risk relationship;
receiving, by the computer processor, aerial imagery for the roof of the building;
receiving, by the computer processor, street level imagery for the roof of the building;
automatically correlating the received third-party roof information, aerial imagery, and street level imagery with a particular electronic record in a risk relationship data store that contains electronic records, each electronic record representing a risk relationship between an enterprise and a risk relationship provider, and including, for each risk relationship, an electronic record identifier and a set of roof attribute values;
analyzing, by the computer processor, the aerial imagery using a machine learning algorithm and historic insurance claim data to determine an updated roof attribute value;
updating a roof attribute value of the particular electronic record in accordance with the updated roof attribute value; and
calculating, by a predictive analytics engine, a roof risk score associated with the particular electronic record.

15. The medium of claim 14, wherein the updated roof attribute data is associated with at least one of: (i) a roof square footage, (ii) a roof age, (iii) a roof covering material, (iv) a roof shape, (v) a roof risk evaluation, and (vi) a roof hazard.

16. The medium of claim 14, wherein the updated roof attribute data is associated with at least one of: (i) a solar panel, (ii) a chimney, (iii) building heating or cooling equipment, (iv) a water tank, (v) a gutter condition, (vi) a roof extension, (vii) a satellite dish, (viii) public roof use, and (ix) a skylight.

17. The medium of claim 14, wherein the building is associated with at least one of: (i) an office building, (ii) a warehouse, (iii) a residence, (iv) a hanger, (v) a retail establishment, (vi) a stadium, and (vii) any other building structure that is associated with a risk relationship.

18. The medium of claim 14, wherein the risk relationship is associated with an insurance policy and the risk score is to be used in connection with at least one of: (i) insurance policy underwriting, (ii) insurance premium pricing, (iii) insurance physical inspection decisions, (iv) service levels, (v) insurance policy renewals, and (vi) insurance claim servicing.

\* \* \* \* \*